May 17, 1960   F. E. VAN ALSTINE   2,936,720
TRUCK STEERING MECHANISM FOR TRAINS
Filed Sept. 11, 1957   2 Sheets-Sheet 1
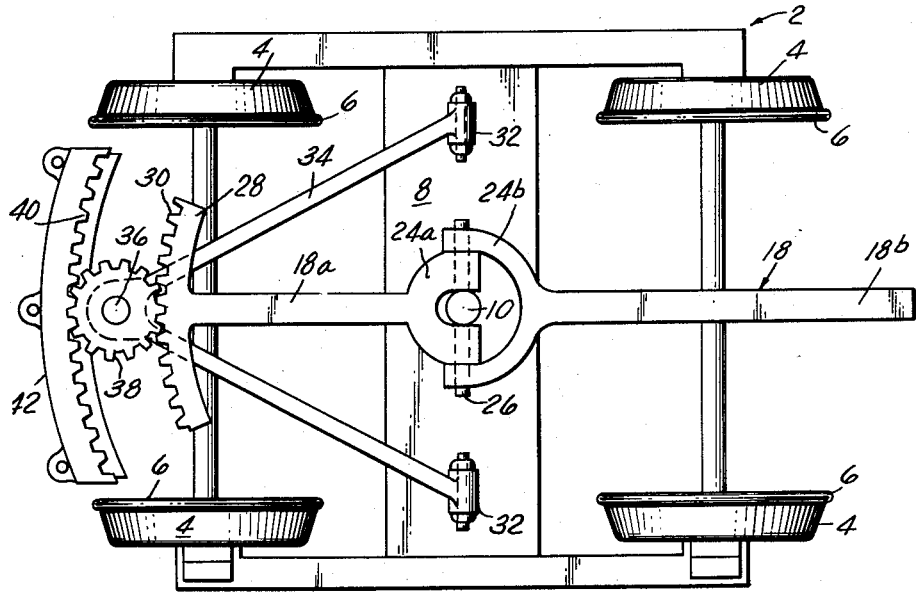
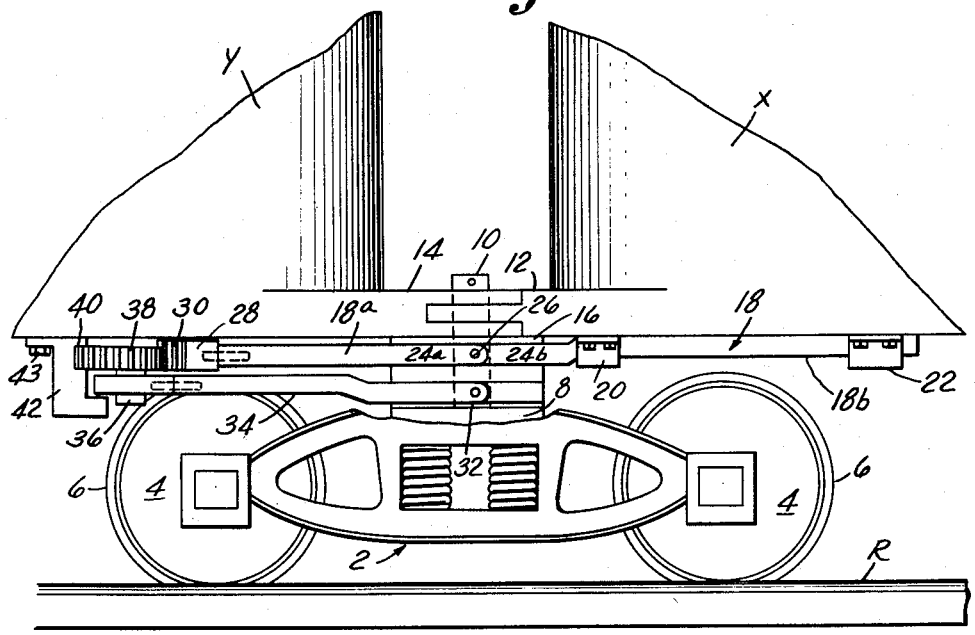
INVENTOR
FRANCIS E. VAN ALSTINE
BY James H. Littlepage
ATTORNEY

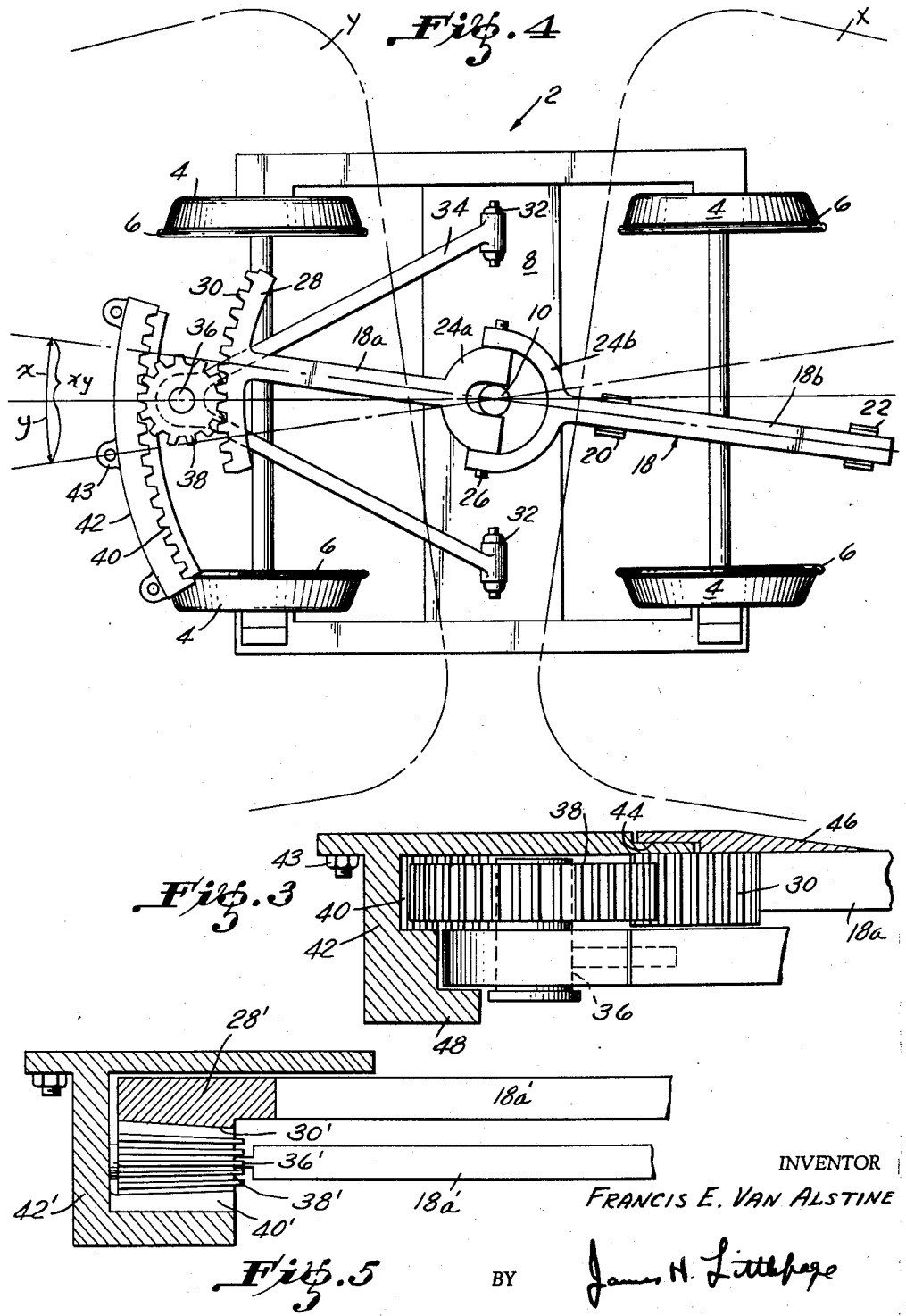

United States Patent Office 2,936,720
Patented May 17, 1960

2,936,720
TRUCK STEERING MECHANISM FOR TRAINS

Francis E. Van Alstine, Sioux City, Iowa

Application September 11, 1957, Serial No. 683,238

4 Claims. (Cl. 105—4)

This invention relates to steering mechanism for railway vehicles and is intended primarily, although not exclusively, for articulated trains.

The primary object of this invention is to provide a steering mechanism for railway vehicles which will maintain the wheel flanges substantialy tangential to the rails at all times so as to avoid tendency of the wheels to climb the rails by positive exposure, on the one hand, and to prevent frictional drag of the flanges against the rail as a result of negative exposure, on the other hand.

According to this invention, it is intended to provide a steering mechanism connected between adjacent cars of a train and arranged so that upon relative angular movement between the adjacent cars, the active member of the steering mechanism which determines the direction of the wheel truck bisects the angle formed by the cars.

More specifically, the object now is to provide a pair of quadrant gears, respectively associated and moving with adjacent cars which are supported on a common axle or truck, and a floating pinion enmeshed between the quadrant gears, the pinion being on a steering tongue for the truck. Thus the angular movement of the pinion and the associated tongue and truck is always half the angular movement of each of the quadrant gears between which the pinion is enmeshed. It is thus intended to provide an extremely simple and rugged mechanism for accomplishing the hitherto unfulfilled objectives of the more elaborate lever and linkage mechanisms previously proposed and, furthermore, to provide an axle steering mechanism capable of adaptation to other than articulated trains.

These and other objects will be apparent from the following specification and drawings, in which:

Fig. 1 is a side elevation showing the invention applied to a railway truck with fragments of two adjacent freight cars supported thereon;

Fig. 2 is a plan view of the steering mechanism, with the cars and certain parts removed for simplifying the illustration;

Fig. 3 is an enlarged fragmentary vertical section showing the quadrant gear and pinion mechanism;

Fig. 4 is a plan view, similar to Fig. 2 but diagrammatically illustrating the action of the steering mechanism when the cars turn with respect to one another; and, Fig. 5 is a view similar to Fig. 3, but illustrating an alternate form utilizing beveled gears for permitting greater slack or lost motion between the cars.

Referring now to the drawings in which like reference numerals denote similar elements, the invention is illustrated as applied to adjacent cars X and Y of a freight train, it being understod that the type of train and car is immaterial, other than that in the embodiment of Figs. 1 to 4 the car coupling has no appreciable slack, and the Fig. 5 modification is intended for a slack coupling. Cars X and Y are rollingly supported on rails R by a truck 2 having wheels 4 with conventional flanges 6. A central beam 8 extending across truck 2 supports a central vertical coupling pin 10 on which tongues 12 and 14 of cars X and Y are pivotally engaged and supported by a suitable bearing plate 16, the details of the coupling and support of the cars being unimportant, other than that they are supported on a common truck and pivot about a common vertical axis on the truck.

Extending forwardly from car X, to the left as seen in the drawings, is a lever arm 18 centrally supported on car X, as indicated at 20 and 22, so as to extend forwardly therefrom along the center line of the car. Lever arm 18 is composed of forward and rear sections 18a, 18b respectively connected by forks 24a, 24b to a pivot pin 26 extending horizontally through coupling pin 10. While the forward and rear sections 18a and 18b of lever arm 18 may pivot relative to one another about the horizontal axis of pivot pin 26 in response to tipping motion between cars X and Y and truck 2, the sections of the lever arm swing horizontally as one rigid arm about the vertical axis constituted by coupling pin 10. The forward section 18a of the lever arm carries, on its forward end, a quadrant gear 28, having teeth 30.

Supported by trunnions 32 mounted on central beam 8 on each side of coupling pin 10 is a tiller yoke 34 having on its forward end a vertical stub shaft 36 which rotatably supports a pinion 38. Pinion 38 is enmeshed between the teeth 30 of quadrant gear 28 and also the teeth 40 of a quadrant gear 42 mounted, as by bolts 43, on car Y. Preferably, quadrant gear 42 is provided with a guide flange 44 slidably supporting a guide plate 46 on the forward section of lever arm 18a, and sliding support for the forward end of tiller yoke 34 is provided by a bearing flange 48 on quadrant gear 42.

Ordinarily, when cars X and Y are on straight track, the parts are related as diagrammatically illustrated in Fig. 2, wherein lever arm 18 extends fore and aft along the center line of truck 2, and pinion 38 is enmeshed between the central portions of quadrant gears 30 and 42, and the longitudinal axes of cars X and Y are at zero angles with respect to one another and the fore-and-aft direction of truck 2. Fig. 4 illustrates, with considerable exaggeration over conditions normally found on a conventional track, the action of the mechanism when the train encounters a curve and cars X and Y swing angularly with respect to one another. Car X has assumed the angle $x$, as compared with the zero angle which it had on a straight track, and car Y has assumed the angle $y$, the cars having a total angle $xy$ with respect to one another. In this example, angles $x$ and $y$ are substantially equal and opposite. Since the angular movement of pinion 38 is the resultant of the relative movement of quadrant gears 30 and 42, its axis always substantially bisects the total angle $xy$ formed between the center lines of cars X and Y, and since stub shaft 36 of pinion 38, operating through tiller yoke 34, guides truck 2, the angular extent to which truck 2 swings with respect to the track is always substantially half the total angle $xy$ between the center lines of cars X and Y. The flanges 6 of truck wheels 4 thus maintain substantially a zero angle with respect to the track, plus or minus a negligible angle dependent on the distance the wheels are offset forwardly or rearwardly from coupling pin 10. If, instead of a four-wheel truck, a two-wheel truck is utilized, with the axle passing beneath coupling pin 10, the wheel flanges will be substantially tangential to the track.

Prior to entering a curve, the parts are as shown in Fig. 1. As the curve is first entered, lead car Y swings about pivot 10 and assumes a slight angle with respect to car X. Quadrant gear 42, being fixed on car Y, swings laterally about pivot 10 towards a position, shown with exaggeration, in Fig. 4, thus rolling pinion 38 on quadrant gear 28. The extent to which pinion 38 is rolled on quadrant gear 28 is always equal to half the prevailing angle between the longitudinal axes of cars X and Y. Upon leaving a turn, as the track straightens, the angle between cars X and Y gradually lessens to zero and the parts correspondingly return from their Fig. 4 position to that of Fig. 1.

Fig. 5 illustrates an alternate gear arrangement which may be utilized where a slack coupling is desired between the cars. Quadrant gear 28' on the forward section of lever arm 18a' is provided with downwardly facing beveled teeth 38' whereas the teeth 40' on quadrant gear 42' are beveled and face upwardly, pinion 38' being rotatably mounted on a suitable stub shaft extending forwardly from tiller yoke 34' and having teeth complementary to those on the quadrant gear. All of the teeth on the quadrant gears and pinion are beveled to the radii from the junction of coupling pin 10 and pivot pin 26, there being sufficient slack between the gears to permit limited forward and rear relative motion between quadrant gears 30' and 41' while pinion 38' remains drivingly enmeshed therebetween. Other than a slack coupling between the cars, the other parts of the Fig. 5 embodiment are as in Figs. 1–4, inclusive.

In both embodiments, cars X and Y are provided with driving gears 30 and 42, or 30' and 42', which move oppositely to one another in response to pivoting of the cars with respect to one another, and the angularly movable steering element of truck 2, i.e., steering yoke 34 or 34', has an operating member constituted by pinion 38 or 38' floatingly engaged between the gears and driven thereby so that its resultant angular displacement is one-half the relative angular displacement between the cars.

The invention is not limited to the details of the structure disclosed and described herein, but is intended to cover all substitutions, modifications and equivalents within the scope of the following claims.

I claim:

1. In an articulated vehicle, a truck, vertical pivot means disposed substantially on the longitudinal center line of said truck, an adjacent pair of cars disposed forwardly and rearwardly of said truck, means mounting the adjacent ends of said cars on said truck for pivotal movement about said vertical pivot means, a first quadrant gear disposed generally transversely on one of said cars and moving therewith, a lever having one end attached to the other of said cars, said lever extending towards said one car and having an intermediate portion extending across said vertical pivot means and a free end disposed adjacent said first quadrant gear, a second quadrant gear generally parallel with the first quadrant gear on the free end of said lever, a steering tongue, means mounting said steering tongue on said truck, said steering tongue extending towards said quadrant gears and having a free end disposed adjacent thereto, and a pinion gear rotatably supported on the free end of the steering tongue, said pinion gear being floatingly engaged between said quadrant gears.

2. The combination claimed in claim 1, the means mounting said steering tongue on said truck providing a horizontal pivot connection therebetween, the pivotal axis of said connection extending transversely of the truck.

3. The combination claimed in claim 1, said lever having a portion intermediate its ends disposed adjacent said vertical pivot means, and means providing a horizontal pivot connection between the intermediate portion of said lever and said vertical pivot means.

4. In an articulated vehicle, a truck, vertical pivot means disposed substantially on the longitudinal center line of said truck, an adjacent pair of cars disposed forwardly and rearwardly of said truck, means mounting the adjacent ends of said cars on said truck for pivotal movement about said vertical pivot means, and means for steering said truck comprising a first gear affixed on one of said cars for swinging movement therewith about said vertical pivot means, said first gear having a row of teeth disposed along an arc of a radius of said vertical pivot means, a lever attached to said vertical pivot means and having one end attached to the other of said cars, a second gear affixed to said lever for movement therewith about said vertical pivot means, said second gear also having a row of teeth disposed on an arc of a radius of said vertical pivot means, a steering tongue mounted on said truck, and pinion gear means rotatably mounted on said steering tongue and meshing with said first and second gears whereby said steering tongue moves according to a resultant of the relative movement of said first and second gears.

References Cited in the file of this patent

UNITED STATES PATENTS

| 503,831 | Cooper | Aug. 22, 1893 |
| 2,030,010 | Liechty | Feb. 4, 1936 |
| 2,106,698 | Bananno | Feb. 1, 1939 |
| 2,756,688 | Furrer | July 31, 1956 |
| 2,846,954 | Gaynor | Aug. 12, 1958 |

FOREIGN PATENTS

| 1,109,124 | France | Sept. 21, 1955 |
| 552,538 | Germany | June 15, 1932 |
| 930,151 | Germany | July 11, 1955 |
| 947,617 | Germany | Aug. 23, 1956 |